United States Patent
Igarashi

(10) Patent No.: US 8,812,735 B2
(45) Date of Patent: Aug. 19, 2014

(54) CONTENT REPRODUCTION SYSTEM, CONTENT REPRODUCTION APPARATUS, PROGRAM, CONTENT REPRODUCTION METHOD, AND PROVIDING CONTENT SERVER

(75) Inventor: Tatsuya Igarashi, Tokyo (JP)

(73) Assignee: Sony Corporation, Tokyo (JP)

( * ) Notice: Subject to any disclaimer, the term of this patent is extended or adjusted under 35 U.S.C. 154(b) by 834 days.

(21) Appl. No.: 12/899,178

(22) Filed: Oct. 6, 2010

(65) Prior Publication Data

US 2011/0093617 A1    Apr. 21, 2011

(30) Foreign Application Priority Data

Oct. 15, 2009   (JP) ................................ P2009-238130

(51) Int. Cl.
*G06F 15/16*   (2006.01)
(52) U.S. Cl.
USPC ........................................................ 709/246
(58) Field of Classification Search
USPC ........................................................ 709/246
See application file for complete search history.

(56) References Cited

U.S. PATENT DOCUMENTS

| | | | | |
|---|---|---|---|---|
| 7,263,548 B2 * | 8/2007 | Daswani et al. | ............... | 709/217 |
| 7,424,520 B2 * | 9/2008 | Daswani et al. | ............... | 709/217 |
| 7,555,009 B2 * | 6/2009 | Oshima | ......................... | 370/467 |
| 7,715,827 B2 * | 5/2010 | Yoo | ............................ | 455/412.1 |
| 7,779,159 B2 * | 8/2010 | Seo | ............................... | 709/246 |
| 7,853,981 B2 * | 12/2010 | Seo | ............................... | 725/100 |
| 8,090,682 B2 * | 1/2012 | Doi | ............................... | 707/610 |
| 2003/0055995 A1 * | 3/2003 | Ala-Honkola | ................. | 709/231 |
| 2003/0221014 A1 * | 11/2003 | Kosiba et al. | ................. | 709/231 |
| 2004/0151320 A1 * | 8/2004 | Hitachi et al. | ................. | 380/277 |
| 2004/0267821 A1 * | 12/2004 | Kiyama et al. | ............... | 707/200 |
| 2005/0105555 A1 * | 5/2005 | Oshima | ......................... | 370/469 |
| 2005/0123136 A1 * | 6/2005 | Shin et al. | ..................... | 380/217 |
| 2006/0136457 A1 * | 6/2006 | Park et al. | ..................... | 707/101 |
| 2006/0259781 A1 * | 11/2006 | Saeki et al. | .................... | 713/189 |
| 2007/0022215 A1 * | 1/2007 | Singer et al. | .................. | 709/246 |
| 2007/0050517 A1 * | 3/2007 | Doi | ............................... | 709/236 |
| 2007/0143807 A1 | 6/2007 | Suneya | | |

(Continued)

FOREIGN PATENT DOCUMENTS

EP        1 298 931 A2    4/2003
JP       2008-033838      2/2008

(Continued)

OTHER PUBLICATIONS

Zambelli; "IIS Smooth Streaming Technical Overview", Microsoft Corporation, pp. 1-17, (2009).

(Continued)

*Primary Examiner* — Rupal Dharia
*Assistant Examiner* — Marcus McKenzie
(74) *Attorney, Agent, or Firm* — Finnegan, Henderson, Farabow, Garrett & Dunner, L.L.P.

(57) ABSTRACT

A method, apparatus, encoder, and decoder for receiving, transmitting, encoding and decoding content is provided. The method includes receiving a first segment of the content, the first segment having a first format, receiving, from a transmitting apparatus, a second segment of the content, the second segment having a second format, monitoring a network status between the receiving apparatus and the transmitting apparatus, and selecting the first segment or the second segment based on the monitored network status.

25 Claims, 12 Drawing Sheets

(56) References Cited

U.S. PATENT DOCUMENTS

| | | | | |
|---|---|---|---|---|
| 2007/0261092 | A1* | 11/2007 | Ozawa et al. | 725/115 |
| 2008/0147700 | A1* | 6/2008 | Doi | 707/101 |
| 2009/0150557 | A1 | 6/2009 | Wormley et al. | |
| 2009/0157750 | A1* | 6/2009 | Kim et al. | 707/104.1 |
| 2009/0164487 | A1* | 6/2009 | Kiyama et al. | 707/100 |
| 2009/0171785 | A1* | 7/2009 | Kano et al. | 705/14 |
| 2009/0313293 | A1* | 12/2009 | Setlur et al. | 707/102 |
| 2009/0319679 | A1* | 12/2009 | Okada et al. | 709/230 |
| 2010/0131671 | A1* | 5/2010 | Kohli et al. | 709/233 |
| 2010/0146018 | A1* | 6/2010 | Kim | 707/822 |
| 2010/0185707 | A1* | 7/2010 | Kiyama et al. | 707/822 |
| 2010/0185708 | A1* | 7/2010 | Kiyama et al. | 707/822 |
| 2010/0185709 | A1* | 7/2010 | Kiyama et al. | 707/822 |
| 2010/0185710 | A1* | 7/2010 | Kiyama et al. | 707/822 |
| 2010/0191709 | A1* | 7/2010 | Kiyama et al. | 707/692 |
| 2010/0235542 | A1* | 9/2010 | Visharam et al. | 709/246 |
| 2011/0173345 | A1* | 7/2011 | Knox et al. | 709/246 |
| 2011/0246660 | A1* | 10/2011 | Bouazizi | 709/231 |
| 2011/0289048 | A1* | 11/2011 | Doi | 707/610 |

FOREIGN PATENT DOCUMENTS

| | | |
|---|---|---|
| JP | 2004-135307 | 7/2013 |
| JP | 2005-537742 | 7/2013 |
| JP | 2007-036666 | 7/2013 |

OTHER PUBLICATIONS

Huawei Technologies Co et al.: "Two Solutions for Client-enhanced HTTP Streaming"3GPP Draft; S4-AHI063, No. Seattle, WA, USA, Oct. 1, 2009, pp. 1-3.

Nokia Corporation: "Static HTTP Streaming "3GPP Draft;S4-AHI071, Static HTTP Streaming, $3^{rd}$ Generation Partnership Project (3GPP), Mobile Competence Centre; 650, Route Des Lucioles; F-06921 Sophia-Antipolis Cedex; France Seattle, WA, USA; Oct. 1, 2009, XP050398762, pp. 1-6.

European Search Report issued Jul. 22, 2011 in Europe EP 10 18 6813.

Office Action in Japanese Application No. 2009-238130 dated Jul. 30, 2013.

Office Action in Japanese Application No. 2009-238130 dated Nov. 12, 2013.

* cited by examiner

CONTENT REPRODUCTION SYSTEM, CONTENT REPRODUCTION APPARATUS, PROGRAM, CONTENT REPRODUCTION METHOD, AND PROVIDING CONTENT SERVER

CROSS-REFERENCE TO RELATED APPLICATION

This application claims priority of Japanese Patent Application No. 2009-238130, filed on Oct. 15, 2009, the entire content of which is hereby incorporated by reference.

BACKGROUND

1. Technical Field

The present disclosure relates to a content reproduction system, a content reproduction apparatus, a program, a content reproduction method, and providing a content server.

2. Description of the Related Art

Nowadays, HTTP (HyperText Transfer Protocol) for content transmission and MP4 relating to content compression/encoding are widely used. According to HTTP, not only downloading of content, but also streaming thereof can be performed on the Internet. The HTTP streaming is also adopted by network media standards such as "DLNA guidelines" (2006) and "Open IPTV Forum" (2009). MP4 (ISO/IEC-14496-12, 14) can be used not only as a storage format, but also as a transmission format for downloading, streaming or the like.

For example, "IIS Smooth Streaming Technical Overview," Alex Zambelli, Microsoft Corporation, March 2009 describes how to perform streaming of content via the Internet by using HTTP and MP4. More specifically, "IIS Smooth Streaming Technical Overview," Alex Zambelli, Microsoft Corporation, March 2009 describes that a server stores encoded files in the MP4 format encoded at different bit rates and successively sends segments constituting encoded files appropriate for network conditions.

However, the server side determines an encoded file a segment of which is to be transmitted in a system in related art and thus, there is an issue that loads on the server side increase. Moreover, information such as a time during which a segment is reproduced (a relative time from the start of content) is not provided to the client, which makes it difficult to perform a trick play such as variable-speed reproduction or to perform reproduction by jumping to the relative time (seek reproduction).

Accordingly, there is disclosed a method for transmitting content. The method may include encoding the content in first and second formats; storing the encoded content in first and second files; receiving a request for a formatted segment, the formatted segment comprising a portion of the encoded data in the second file, and the request including position information identifying a location of the formatted segment; and transmitting the formatted segment.

In accordance with an embodiment, there is provided an apparatus for transmitting content. The apparatus may include an encoder configured to encode the content in first and second formats; a storage unit configured to store the encoded content in first and second files; a receiver configured to receive a request for a formatted segment, the formatted segment comprising a portion of the encoded data in the second file, and the request including position information identifying a location of the formatted segment; and a transmitter configured to transmit the formatted segment.

In accordance with an embodiment, there is provided a method for receiving content in a receiving apparatus. The method may include receiving a first segment of the content, the first segment having a first format; receiving, from a transmitting apparatus, a second segment of the content, the second segment having a second format; monitoring a network status between the receiving apparatus and the transmitting apparatus; and selecting the first segment or the second segment based on the monitored network status.

In accordance with an embodiment, there is provided a method for encoding content. The method may include encoding the content to generate content in a first format; encoding the content to generate content in a second format; processing portion information identifying to a portion of the content in the second format; and adding the portion information to the content in the first format.

In accordance with an embodiment, there is provided a method for decoding content. The method may include receiving encoded data, the encoded data including a first section comprising description information and a second section comprising a first-format segment containing content encoded in the first format, the description information including position information; decoding the first-format segment of encoded content; and generating a request for a second-format segment of the encoded content, the second-format segment corresponding to the first-format segment and the request includes at least a portion of the position information.

In accordance with an embodiment, there is provided an apparatus for receiving content in a receiving apparatus. The apparatus may include a receiving unit configured to receive, from a transmitting apparatus, a first segment in a first format and a second segment in a second format, the first segment and the second segment including a portion of the content; a monitoring unit configured to monitor a network status between the receiving apparatus and the transmitting apparatus; and a selecting unit configured to select the first segment or the second segment based on the monitored network status.

In accordance with an embodiment, there is provided an apparatus for encoding content. The apparatus may include an encoder configured to encode the content to generate content in a first format and a second format content; a processing unit configured to process portion information identifying a portion of the content in the second format; and an adding unit configured to add the portion information to the content in the first format.

DETAILED DESCRIPTION OF THE EMBODIMENT(S)

Figure 1:
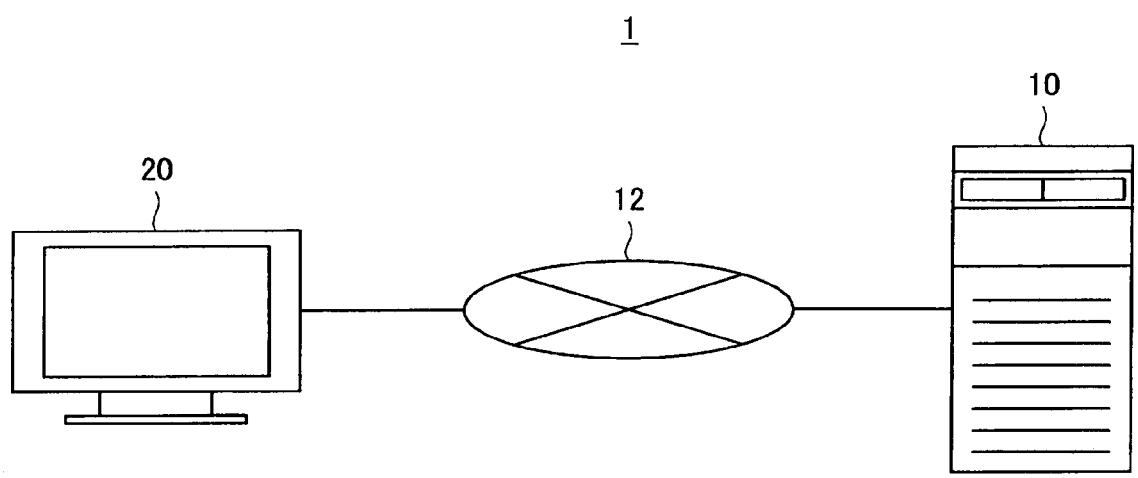
FIG. 1 is an explanatory view showing the configuration of a content reproduction system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

"DETAILED DESCRIPTION OF THE EMBODIMENT" will be described according to the order shown below:

1. Overview of Content Reproduction System
2. Hardware Configuration of Content Reproduction Apparatus
3. Function of Content Server
4. Function of Content Reproduction Apparatus
5. Operation of Content Reproduction System
6. Modifications
7. Conclusion

1. Overview of Content Reproduction System

First, a content reproduction system 1 according to an embodiment of the present invention will schematically be described with reference to FIGS. 1 and 2.

FIG. 1 is an explanatory view showing the configuration of a content reproduction system according to an embodiment of the present invention. As shown in FIG. 1, the content reproduction system 1 according to an embodiment of the present invention includes a content server 10 (e.g., transmitting apparatus), a network 12, and a content reproduction apparatus 20 (e.g., client and/or receiving apparatus).

The content server 10 and the content reproduction apparatus 20 are connected via the network 12. The network 12 is a wire or wireless transmission path of information transmitted from an apparatus connected to the network 12.

The network 12 may contain, for example, a public network such as the Internet, a telephone network, and a satellite communication network or LAN (Local Area Network) or WAN (Wide Area Network) including Ethernet (registered trademark). The network 12 may also contain a leased line network such as IP-VPN (Internet Protocol-Virtual Private Network).

The content server 10 encodes content data to generate and store a data file containing encoded data (e.g., first-format segments and/or second format segments) and meta-information (e.g., description information and/or portion information) of the encoded data. When the content server 10 generates a data file in the MP4 format, encoded data corresponds to "mdat" and meta-information corresponds to "moov".

Content data may be music data of music, lectures, radio programs and the like, video data of movies, TV programs, video programs, photos, documents, pictures, charts and the like, games, software and the like.

The content server 10 according to the present embodiment generates a plurality of data files from the same content at different bit rates (e.g., compression formats). Relevant points will be described more specifically below with reference to FIG. 2.

Figure 2:
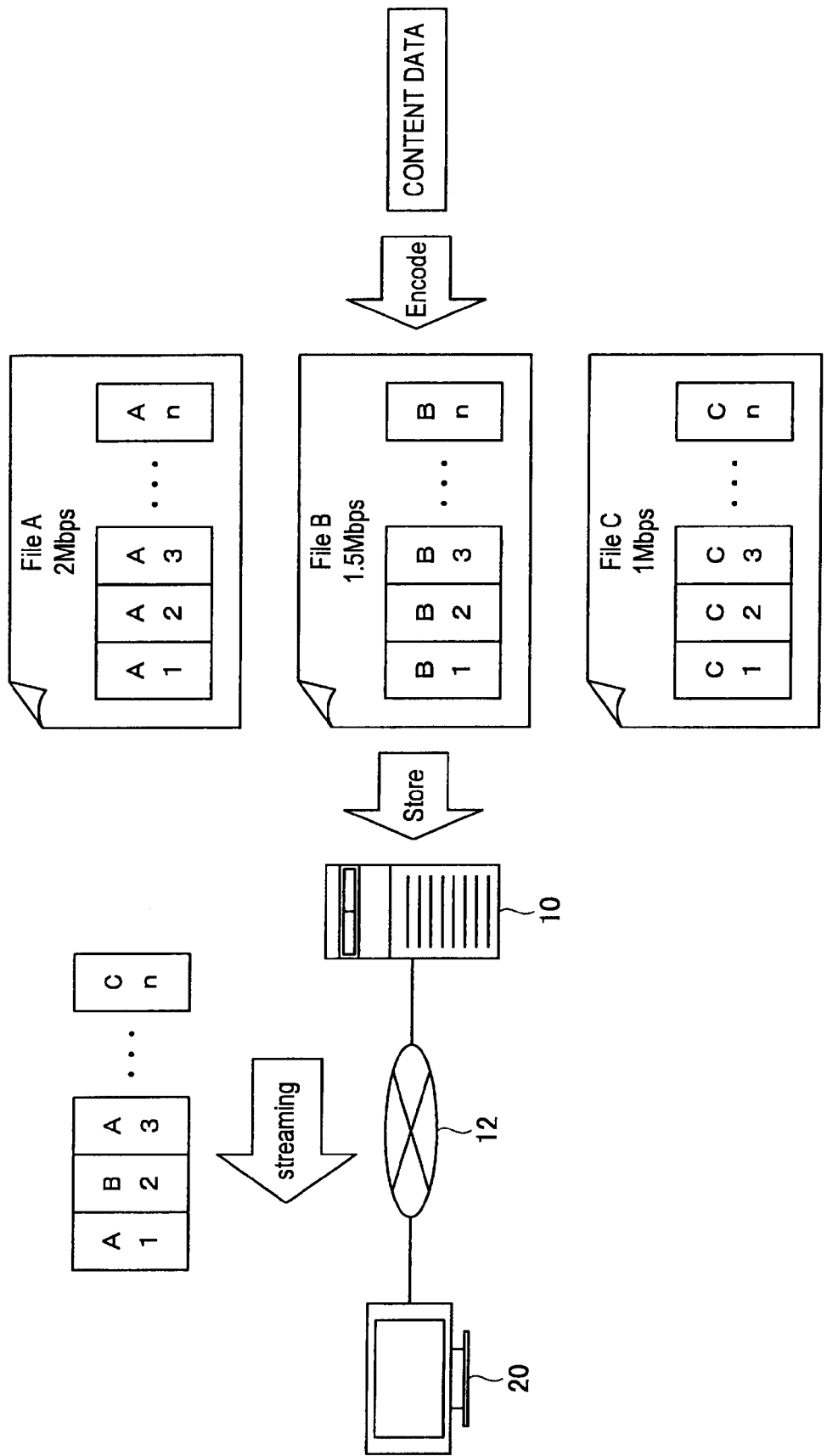
FIG. 2 is an explanatory view showing the flow of data in the content reproduction system according to the present embodiment.

FIG. 2 is an explanatory view showing the flow of data in the content reproduction system 1 according to the present embodiment. The content server 10 encodes the same content data at different bit rates to generate, for example, as shown in FIG. 2, a file A at 2 Mbps, a file B at 1.5 Mbps, and a file C at 1 Mbps. The file A is relatively at a high bit rate, the file B at a standard bit rate, and the file C at a low bit rate.

Also as shown in FIG. 2, encoded data of each file is divided into a plurality of segments. For example, encoded data of the file A is divided into segments (e.g., first format segments) "A1", "A2", "A3", . . . , "An", encoded data of the file B into segments (e.g., second format segments) "B1", "B2", "B3", . . . , "Bn", and encoded data of the file C into segments "C1", "C2", "C3", . . . , "Cn".

Each segment is constituted by samples constituted by one or two or more pieces of video encoded data and audio encoded data that begin with sync samples (for example, IDR-pictures for video encoding of AVC/H.264) of MP4 and can be reproduced alone. If, for example, video data of 30 frames/second is encoded by GOP (Group of Picture) of 15 frames fixed length, each segment may be video and audio encoded data of 2 seconds corresponding to 4 GPO or video and audio encoded data of 10 seconds corresponding to 20 GPO.

Reproduction ranges (ranges of time positions from the start of content) by segments whose arrangement order in each file is the same are the same. For example, the reproduction range of the segment "A2", that of the segment "B2", and that of the segment "C2" are the same and if each segment is encoded data of two seconds, the reproduction ranges of the segment "A2", the segment "B2", and the segment "C2" are all 2 seconds to 4 seconds of content.

After generating the file A to the file C each constituted by the plurality of segments, the content server 10 stores the file A to the file C. Then, as shown in FIG. 2, the content server 10 sequentially sends segments constituting different files to the content reproduction apparatus 20 and the content reproduction apparatus 20 reproduces the received segments as streaming.

A display apparatus is shown in FIG. 1 as an example of the content reproduction apparatus 20, but the content reproduction apparatus 20 is not limited to such an example. For example, the content reproduction apparatus 20 may be an information processing apparatus such as a PC (Personal Computer), home video processing apparatus (such as a DVD recorder and VCR), PDA (Personal Digital Assistant), home game machine, and home electric appliance. Alternatively, the content reproduction apparatus 20 may be an information processing apparatus such as a mobile phone, PHS (Personal Handyphone System), portable music reproducing apparatus, portable video processing apparatus, and portable game machine.

It is desirable that segments in accordance with network conditions (e.g., network status) are transmitted from the content server 10. For example, it is suitable to transmit high-bit-rate segments (for example, segments constituting the file A) if the network has sufficient bands and low-bit-rate segments (for example, segments constituting the file C) if the network does not have sufficient bands.

However, there is an issue that loads on the content server 10 grow if the content server 10 monitors network conditions and selects segments in accordance with network conditions.

Thus, the above background led to the creation of the content reproduction system 1 according to the present embodiment. According to content reproduction system 1 in the present embodiment, adaptive streaming can be realized while reducing loads on the server side.

Further, according to the content reproduction system 1 in the present embodiment, most of standards such as HTTP and MP4 are supported and also compatibility with existing apparatuses can be maintained. The content reproduction apparatus 20 and the content server 10 constituting the content reproduction system 1 according to the present embodiment will be described below in detail.

2. Hardware Configuration of Content Reproduction Apparatus

Figure 3:
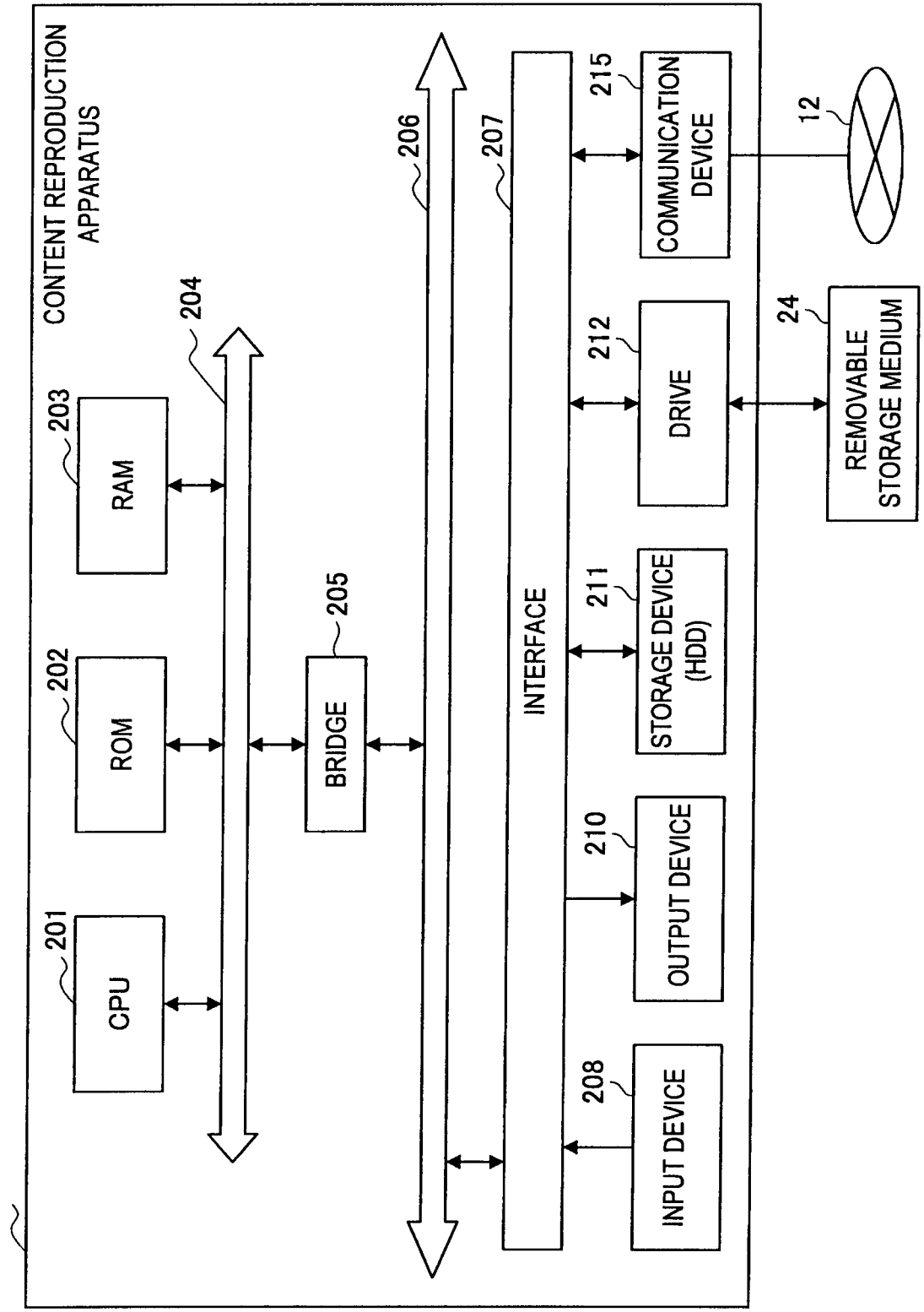
FIG. 3 is a block diagram showing the hardware configuration of a content reproduction apparatus.

FIG. 3 is a block diagram showing the hardware configuration of the content reproduction apparatus 20. The content reproduction apparatus 20 includes a CPU (Central Processing Unit) 201, a ROM (Read Only Memory) 202, a RAM (Random Access Memory) 203, and a host bus 204. The content reproduction apparatus 20 also includes a bridge 205, an external bus 206, an interface 207, an input device 208, an output device 210, a storage device (HDD) 211, a drive 212, and a communication device 215.

The CPU 201 functions as an arithmetic processing apparatus and a control apparatus to control overall operations of the content reproduction apparatus 20 according to various programs. The CPU 201 may be a microprocessor, a processing unit, an adding unit, and/or a request unit. The ROM 202 stores programs, arithmetic parameters and the like used by the CPU 201. The RAM 203 temporarily stores programs used for execution by the CPU 201 and parameters that appropriately change during execution thereof. These units are mutually connected by the host bus 204 composed of a CPU bus or the like.

The host bus 204 is connected to the external bus 206 such as a PCI (Peripheral Component Interconnect/Interface) bus via the bridge 205. Incidentally, the host bus 204, the bridge 205, and the external bus 206 are not necessarily constituted separately and these functions may be implemented by one bus.

The input device 208 is constituted by an input means used by a user to input information such as a mouse, keyboard, touch panel, button, microphone, switch, and lever and an input control circuit that generates an input signal based on input by the user and outputs the input signal to the CPU 201. The user of the content reproduction apparatus 20 can input various kinds of data into the content reproduction apparatus 20 and issue instructions of a processing operation by operating the input device 208.

The output device 210 contains, for example, a display device such as a CRT (Cathode Ray Tube) display device, liquid crystal display (LCD) device, OLED (Organic Light Emitting Diode) device, and lamp. Further, the output device 210 contains an audio output device such as a speaker and headphone. The output device 210 outputs, for example, reproduced content. More specifically, the display device displays various kinds of information such as reproduced video data as text or images. The audio output device, on the other hand, converts reproduced audio data or the like into sound and outputs the sound.

The storage device 211 is a device for data storage constituted as an example of the storage unit of the content reproduction apparatus 20 according to the present embodiment. The storage device 211 may contain a storage medium, a recording device that records data in the storage medium, a reading device that reads data from the storage medium, or a deletion device that deletes data recorded in the storage medium. The storage device 211 is constituted by, for example, an HDD (Hard Disk Drive). The storage device 211 drives the hard disk and stores programs executed by the CPU 201 and various kinds of data.

The drive 212 is a reader writer for storage medium and is attached to the content reproduction apparatus 20 internally or externally. The drive 212 reads information recorded in an inserted removable storage medium 24 such as a magnetic disk, optical disk, magneto-optical disk, and semiconductor memory and outputs the information to the RAM 203. The drive 212 can also write information into the removable storage medium 24.

The communication device 215 is a communication interface constituted by, for example, communication devices for connecting to the network 12. The communication device 215 may be a wireless LAN (Local Area Network) compatible communication device, LTE (Long Term Evolution) compatible communication device, or wire communication device that performs communication by wire.

In the foregoing, the hardware configuration of the content reproduction apparatus 20 has been described with reference to FIG. 3. Hardware of the content server 10 can be constituted substantially in the same manner as that of the content reproduction apparatus 20 and thus, a description thereof is omitted.

3. Function of Content Server

Next, the function of the content server 10 according to the present embodiment will be described with reference to FIGS. 4 to 7.

Figure 4:
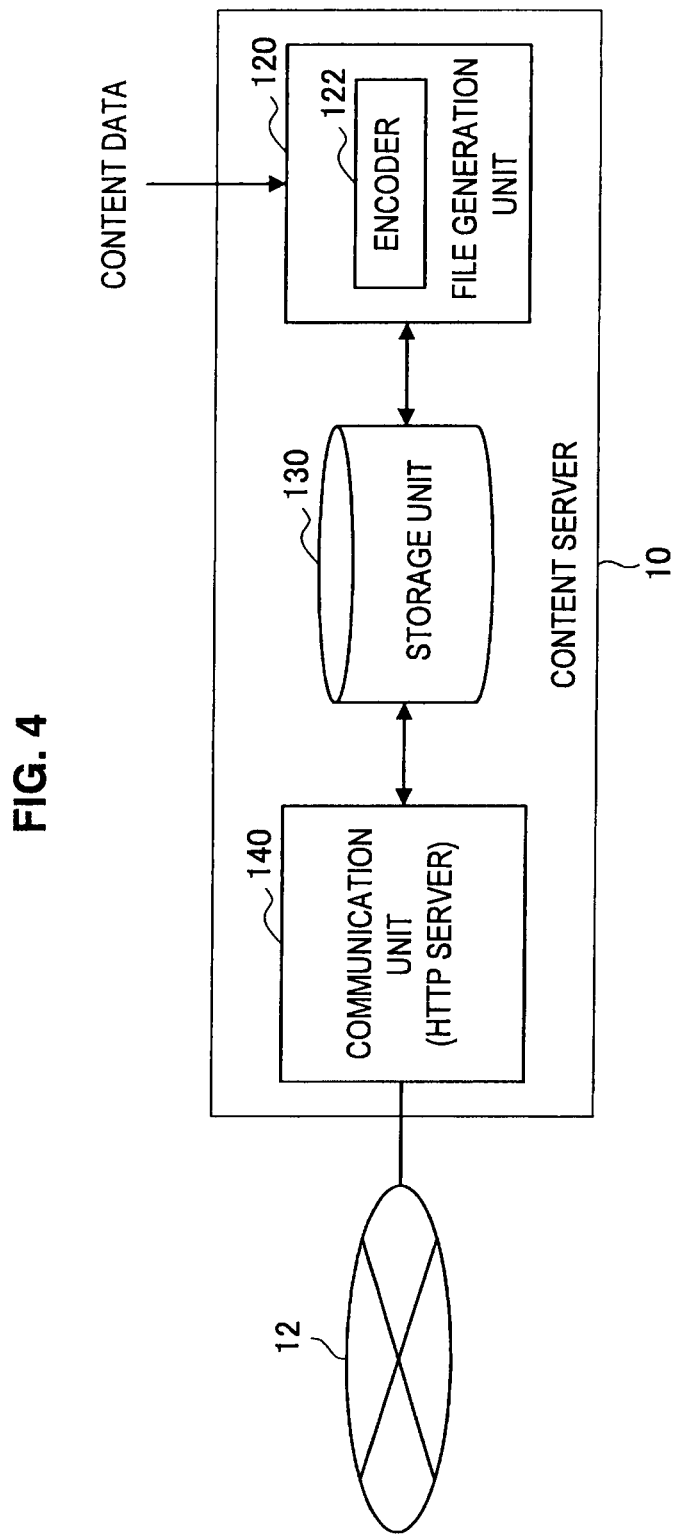
FIG. 4 is a function block diagram showing the configuration of a content server according to the present embodiment.

FIG. 4 is a function block diagram showing the configuration of the content server 10 according to the present embodiment. As shown in FIG. 4, the content server 10 according to the present embodiment includes a file generation unit 120, a storage unit 130, and a communication unit 140.

The file generation unit 120 includes an encoder 122 that encodes content data to generate an MP4 file containing encoded data and metadata thereof. More specifically, the file generation unit 120 generates a plurality of MP4 files having encoded data at different bit rates from the same content. The configuration of a general MP4 file will be described below with reference to FIG. 5 and then, the configuration of an MP4 file generated by the file generation unit 120 in the present embodiment will be described.

Figure 5:
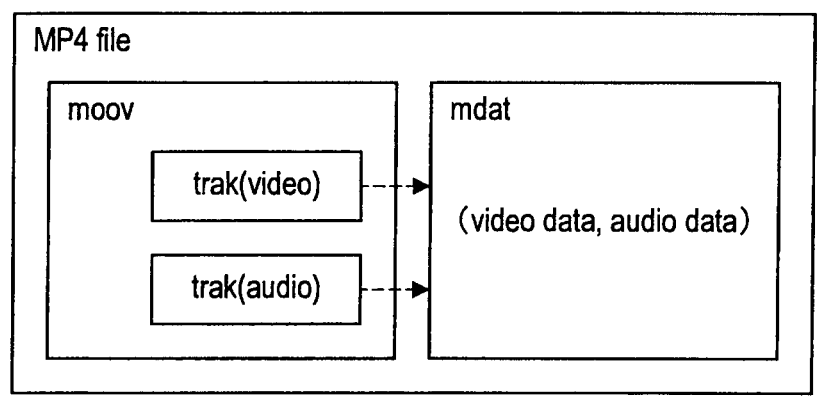
FIG. 5 is an explanatory view showing the configuration of a general MP4 file.

FIG. 5 is an explanatory view showing the configuration of a general MP4 file. As shown in FIG. 5, the MP4 file contains "moov" and "mdat". "mdat" is encoded data of video and audio. In the present embodiment, H.264/AVC is used for video encoding and HE-AAC for audio encoding. "moov" contains access information (e.g., description information and/or, portion information) to each segment contained in "mdat" such as "trak (video)" and "trak (audio)". The access information, an example of which is an index, includes, for example, location information (byte offset) of each sample and reproduction time information.

"dinf" is defined in MP4 as a data box to refer to other external files. If, as shown in FIG. 5, "moov" refers to "mdat" contained in the same MP4 file, the value of "dinf" is "null". In the present embodiment, by contrast, as will be described with reference to FIG. 6, a noticeable effect can be achieved by making full use of this "dinf".

Figure 6:
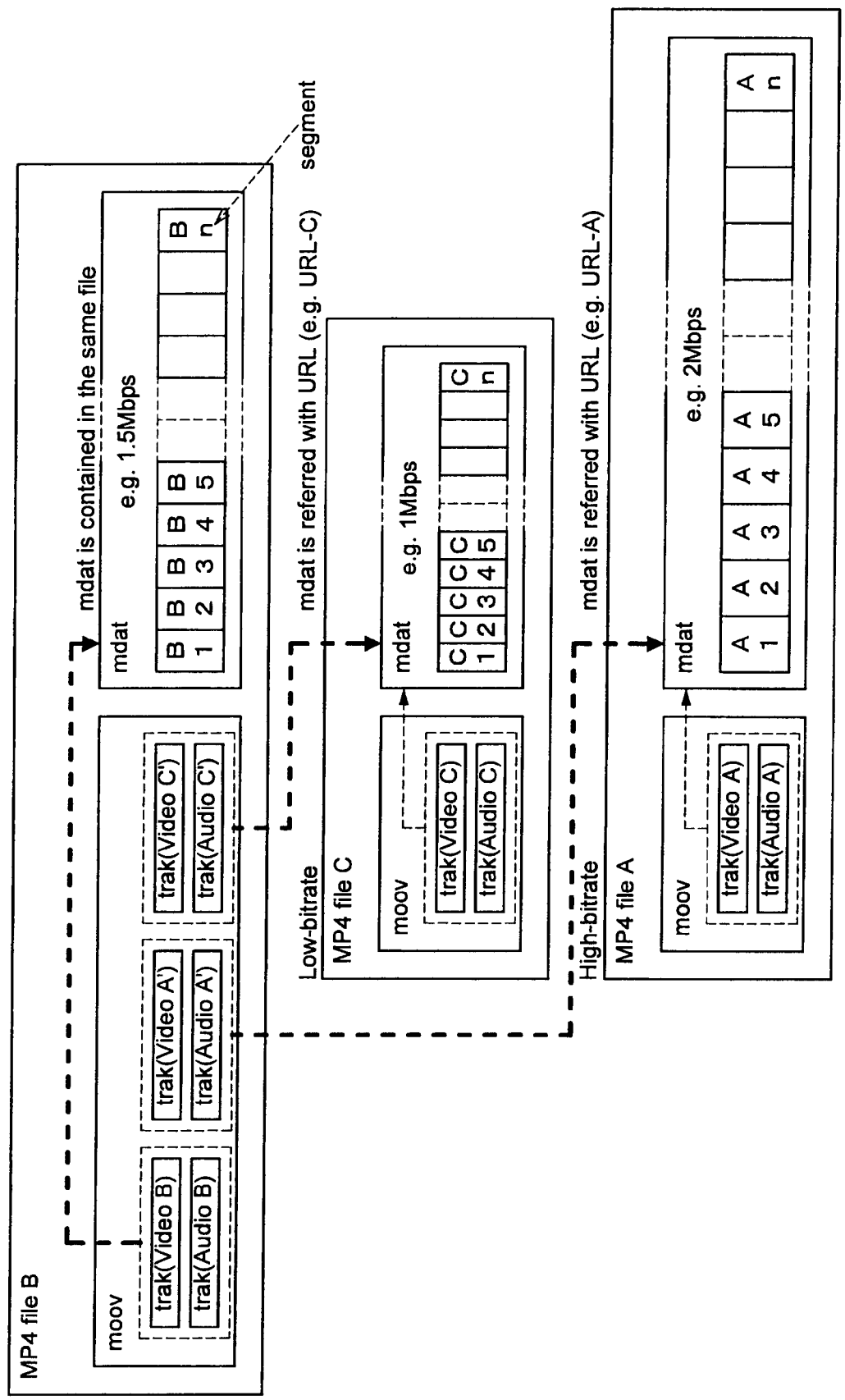
FIG. 6 is an explanatory view showing the configuration of an MP4 file generated by a file generation unit in the present embodiment.

FIG. 6 is an explanatory view showing the configuration of an MP4 file generated by the file generation unit 120 in the present embodiment. As shown in FIG. 6, the file generation unit 120 generates a plurality of MP4 file A to MP4 file C containing "mdat" at different bit rates from the same content.

In the present embodiment, segments are data divided by a boundary of MP4 Sync Sample of video and video encoded data and audio encoded data are arranged in a segment after being interleaved. Segments are continuously arranged in mdat in the time sequence in which content is reproduced. Video and audio are encoded so as to yield the same reproduction time of segments of each data file at different bit rates. In the case of AVC/H.264, video encoded data and audio encoded data are arranged in such a way that an IDR picture is present at the head of a segment, so that data can be switched to data at a different bit rate in segments.

The position of each segment is the position of Sync Sample and the content reproduction apparatus 20 can read segment data from each data file based on the segment position obtained from information of Sample Description box in "moov" or in combination with Sync sample table box contained therein. In the present embodiment, one video frame is set to be one Sample to create a Sync Sample, which is a Sample in which an IDR picture is present once in 30 frames, and Sync sample table box is provided in Sample Description box.

"mdat" of the MP4 file B (first data file) is constituted by segments B1 to Bn whose bit rate is 1.5 Mbps, "mdat" of the MP4 file C (second data file) is constituted by segments C1 to Cn whose bit rate is 1 Mbps, and "mdat" of the MP4 file A (third data file) is constituted by segments A1 to An whose bit rate is 2 Mbps.

"moov" of the MP4 file B contains "trak (videoB')" and "trak (audioB')" to access the segments B1 to Bn constituting the same file.

Further, "moov" of the MP4 file B contains "trak (videoC')" and "trak (audioC')" to access the segments C1 to Cn constituting the MP4 file C.

That is, the URL of the MP4 file C is described in "dinf" of "trak (videoC')" and "trak (audioC')". More specifically, the URL of the MP4 file C is described in the 'location' field in the syntax of "dinf" shown below. Moreover, position information (byte offset in a file) of each Sample and Sync Sample segments C1 to Cn is obtained from information of Sample Description Box of a video track described in "trak (videoC')" and "trak (audioC')".

(Syntax example)

```
aligned(8) class DataEntryUrlBox (bit(24) flags) extends FullBox( 'url ',
    version = 0, flags) {
    string location;
}
```

Similarly, "moov" of the MP4 file B contains "trak (videoA')" and "trak (audioA')" to access the segments A1 to An constituting the MP4 file A. That is, the URL of the MP4 file A is described in "dinf" of "trak (videoA')" and "trak (audioA')".

While the MP4 file A also contains "trak (videoA)" and "trak (audioA)" to access the segments A1 to An constituting the MP4 file A, the content reproduction apparatus 20 does not use these for adaptive streaming described later.

Similarly, while the MP4 file C also contains "trak (videoC)" and "trak (audioC)" to access the segments C1 to Cn constituting the MP4 file C, the content reproduction apparatus 20 does not use these for adaptive streaming described later.

In the present embodiment, as described above, "mdat" having different bit rates are created in different MP4 files rather than the same MP4 file. Moreover, the URL and offset information of each segment in a file to refer to "mdat" contained in other MP4 files are described in Sample Description box of one MP4 file.

With such a configuration, an MP4 file according to the present embodiment can be used not only for streaming, but also for downloading. The reason therefor will be described by comparing with a case where a plurality of "mdat" having different bit rates is generated in the same file.

If the plurality of "mdat" having different bit rates is generated in the same file and the file is also used for downloading, the client will download the whole file containing the plurality of "mdat". Thus, an issue arises that the amount of download data and the download time will unnecessarily double.

In the present embodiment, by contrast, an MP4 file containing only one "mdat" among the plurality of "mdat" with different bit rates can be downloaded. For example, the content reproduction apparatus 20 can download, among the plurality of "mdat" with different bit rates, the MP4 file A containing only "mdat" at a high bit rate. Therefore, the client can download while curbing the amount of download data and the download time.

The file generation unit 120 may write information whether media data referred to by each "trak" belongs to a group of alternative media data obtained by encoding at different bit rates into "minfo" of each track in "moov" of the file B. For example, the following extended block may be provided in the syntax of "minfo" shown below to write the identification number of a group of alternative media data into "alternative_media_group", "<uuid_value>: T. B. D" into "extended_type", and "0" into "flags". The content reproduction apparatus 20 can recognize that segments of media data belonging to a group of alternative media data can be replaced by compatible segments in other media data belonging to the same group. The maximum bit rate maxbitrate and the average bit rate avgbitrate of media are also described, which can be used by the content reproduction apparatus 20 to determine the encoded data segments of which are to be acquired.

(Syntax example)

```
aligned(8) class AlternateMediaInformationBox extends
FullBox( 'uuid' , version=0,
    flags = 0, extended_type){
        unsigned int(32) alternative_media_group;
        unsigned int(32) maxbitrate;
        unsigned int(32) avgbitrate;
}
```

With such a configuration, the content reproduction apparatus 20 can determine whether an MP4 file is generated according to a method in the present embodiment by checking "minfo" in "moov" of the MP4 file. Then, if the MP4 file is a file generated according to a method in the present embodiment, the content reproduction apparatus 20 can request, as described later, adaptive streaming from the content server 10.

An example in which an MP4 file is mainly constituted by "moov" and "mdat" is shown in FIG. 6, but the configuration of an MP4 file is not limited to such an example. For example, access information contained in "moov" shown in FIG. 6 may be arranged, as shown in FIG. 7, in a distributed manner by using "moov" and "moof".

Figure 7:
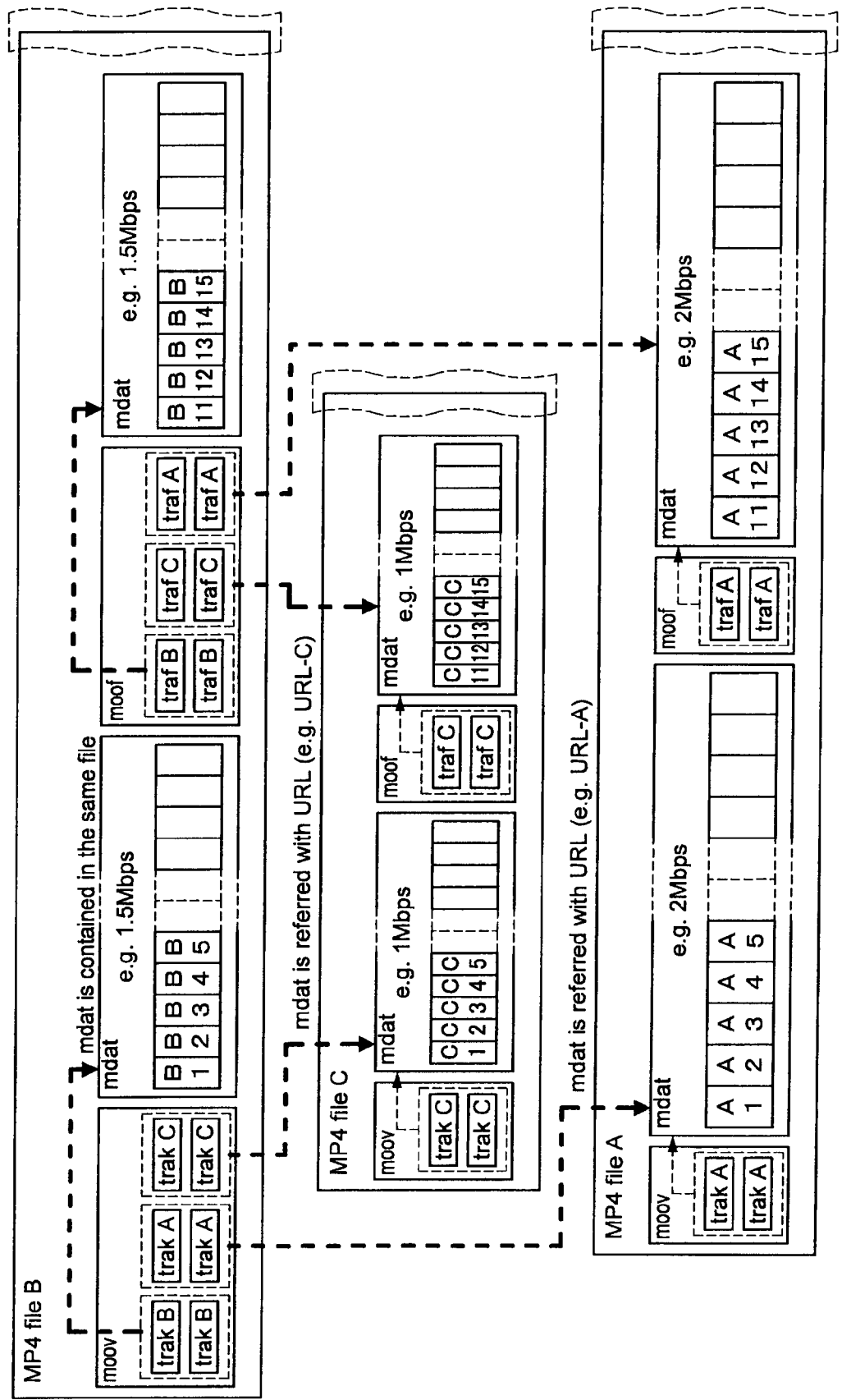
FIG. 7 is an explanatory view showing a modification of the MP4 file generated by the file generation unit in the present embodiment.

FIG. 7 is an explanatory view showing a modification of the MP4 file generated by the file generation unit 120 in the present embodiment. As shown in FIG. 7, "moov" is arranged at the head of each file and then, "mdat" and "moof" are arranged alternately. Like the structure of an MP4 file described above, "moov" of the MP4 file B contains "trak" in which access information to each segment of the MP4 files B, A, and C and Sample Description box to access subsequent "mdat". Each "moof" of the MP4 file B contains a plurality of "traf" corresponding to "trak" described in "moov" and "traf" contains information to access each segment of "mdat" subsequent to each file. The MP4 files C and A may also have "moov" and "moof" described therein, but like the above example, the content reproduction apparatus 20 does not use these for adaptive streaming.

By arranging access information in a distributed manner, the amounts of data of "moov" at the head of the MP4 file B and each "moof" can be made smaller, so that the acquisition time of "moov" at the head can be curbed and information of "moov" and "moof" held by the content reproduction apparatus 20 in a buffer 230 can be reduced. Moreover, "moof" and corresponding mdat can be generated independently and thus can be used for streaming of live content such as live broadcasting. The present embodiment is also applicable to the format shown in FIG. 7 in which "moov", "moof", and "mdat" are arranged in a distributed manner.

Return to the description of the configuration of the content server 10 by referring to FIG. 4. The storage unit 130 of the content server 10 shown in FIG. 4 is a storage medium that stores a plurality of MP4 files generated by the file generation unit 120.

For example, the storage unit 130 may be a storage medium such as a nonvolatile memory, magnetic disk, optical disk, and MO (Magneto Optical) disk. The nonvolatile memory includes, for example, an EEPROM (Electrically Erasable Programmable Read-Only Memory) and EPROM (Erasable Programmable ROM). The magnetic disk includes a hard disk and disc-like magnetic disk. The optical disk includes a CD (Compact Disc), DVD-R (Digital Versatile Disc Recordable), and BD (Blu-ray Disc®).

The communication unit 140 is an interface with the content reproduction apparatus 20 and communicates with the content reproduction apparatus 20 via the network 12. More specifically, the communication unit 140 has a function as an HTTP server that communicates with the content reproduction apparatus 20 according to HTTP. For example, the communication unit 140 extracts data requested from the content reproduction apparatus 20 according to HTTP from the storage unit 130 and transmits the data to the content reproduction apparatus 20 as an HTTP response.

4. Function of Content Reproduction Apparatus

In the foregoing, the function of the content server 10 according to the present embodiment has been described. Next, the function of the content reproduction apparatus 20 according to the present embodiment will be described with reference to FIG. 8.

Figure 8:
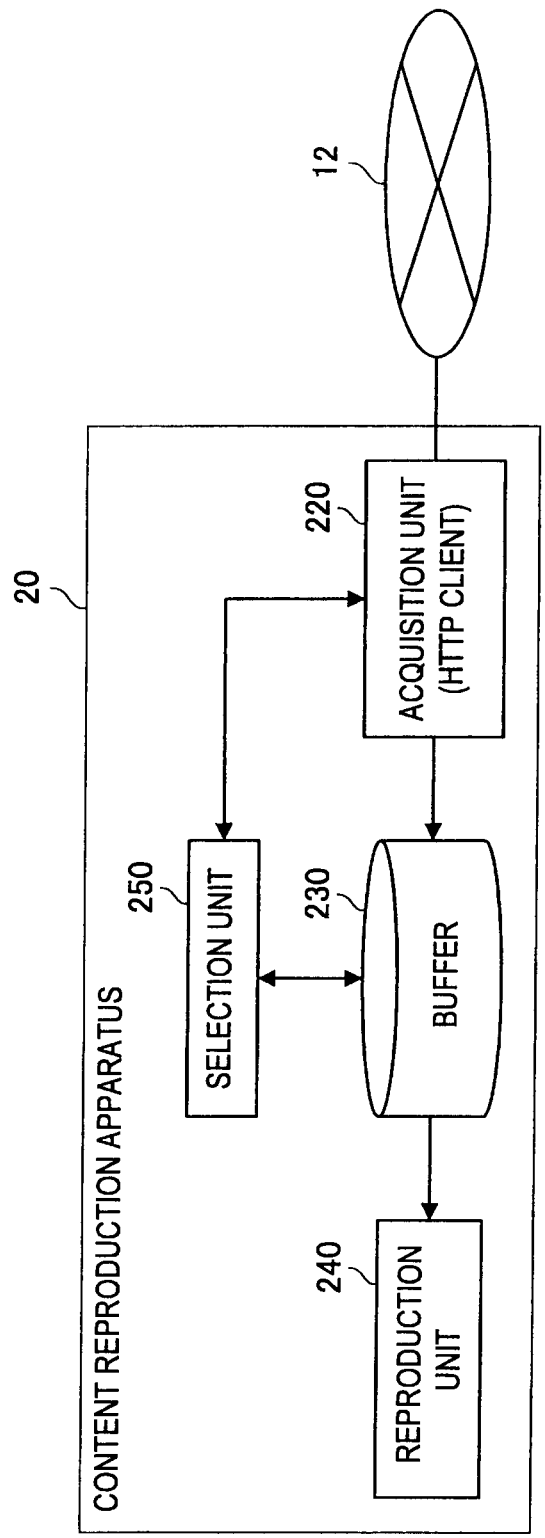
FIG. 8 is a function block diagram showing the configuration of a content reproduction apparatus according to the present embodiment.

FIG. 8 is a function block diagram showing the configuration of the content reproduction apparatus 20 according to the present embodiment. As shown in FIG. 8, the content reproduction apparatus 20 according to the present embodiment includes an acquisition unit 220, the buffer 230, a reproduction unit 240, and a selection unit 250.

The acquisition unit 220 is an interface with the content server 10 and requests data from the content server 10 to acquire the data from the content server 10. More specifically, the acquisition unit 220 has a function as an HTTP client that communicates with the content reproduction apparatus 20 according to HTTP. For example, the acquisition unit 220 can partially acquire a portion (moov or a segment) of an MP4 file from the content server 10 by using HTTP Range.

The buffer 230 sequentially buffers segments acquired by the acquisition unit 220 from the content server 10. Segments buffered in the buffer 230 are sequentially supplied to the reproduction unit 240 according to FIFO (First In First Out).

The reproduction unit 240 sequentially reproduces segments supplied from the buffer 230. More specifically, the reproduction unit 240 performs segment decoding, DA conversion, and rendering.

The selection unit 250 sequentially selects from within the same content an MP4 file a segment of which is to be acquired, that is, a segment having a bit rate to be acquired in accordance with conditions of the network 12. If, for example, the selection unit 250 successively selects segments "A1", "B2", and "A3", as shown in FIG. 2, the acquisition unit 220 successively acquires the segments "A1", "B2", and "A3" from the content server 10.

The acquisition unit 220 acquires "moov" of an MP4 file prior to the acquisition of segments and a segment selected by the selection unit 250 can be acquired from the content server 10 by specifying access information contained in the "moov".

If the band of the network 12 grows, the amount of buffering data in the buffer 230 is assumed to increase and if the band of the network 12 shrinks, the amount of buffering data in the buffer 230 is assumed to decrease. Thus, the selection unit 250 may indirectly grasp conditions of the network 12 by monitoring buffering conditions of the buffer 230.

If, for example, the number of samples (the number of video frames) buffered in the buffer 230 is within a predetermined range, that is, if the reproducible time by samples buffered in the buffer 230 is within a predetermined range, the selection unit 250 may select segments at the standard bit rate (for example, 1.5 Mbps). For example, the content reproduction apparatus 20 starts reproduction of streaming after temporarily accumulating 90 samples at the standard bit rate (for three seconds) and continues the reproduction while reading subsequent segment data and if data in the buffer 230 during reproduction is in the range of 75 to 105 samples, the selection unit 250 selects segments at the standard bit rate.

If, on the other hand, the buffering amount decreases and the reproducible time by samples buffered in the buffer 230 falls below the predetermined range, the selection unit 250 may select segments at a low bit rate (for example, 1 Mbps). If, for example, data in the buffer 230 during reproduction falls to 75 samples or less, the selection unit 250 selects segments at a low bit rate.

If the buffering amount increases and the reproducible time by samples buffered in the buffer 230 exceeds the predetermined range, the selection unit 250 may select segments at a high bit rate (for example, 2 Mbps). If, for example, data in the buffer 230 during reproduction increases to 105 samples or more, the selection unit 250 selects segments at a high bit rate. Further, if the number of segments in the buffer 230 reaches 120 so that segments are sufficiently accumulated, the selection unit 250 temporarily stops reading and when the number thereof falls 120 or below, the selection unit 250 restarts reading.

In the foregoing, as an example of the method for determining the band of the network 12, an example to monitor buffering conditions of the buffer 230 has been described, but the present embodiment is not limited to such an example. For example, the content reproduction apparatus 20 may determine the band of the network 12 by actually transmitting a dummy packet to the network 12 or may determine the band of the network 12 based on the acquisition speed of segments by the acquisition unit 220.

5. Operation of Content Reproduction System

In the foregoing, the functions of the content server 10 and the content reproduction apparatus 20 according to the present embodiment have been described. Next, the operation of the content reproduction system 1 according to the present embodiment will be described with reference to FIG. 9.

Figure 9:
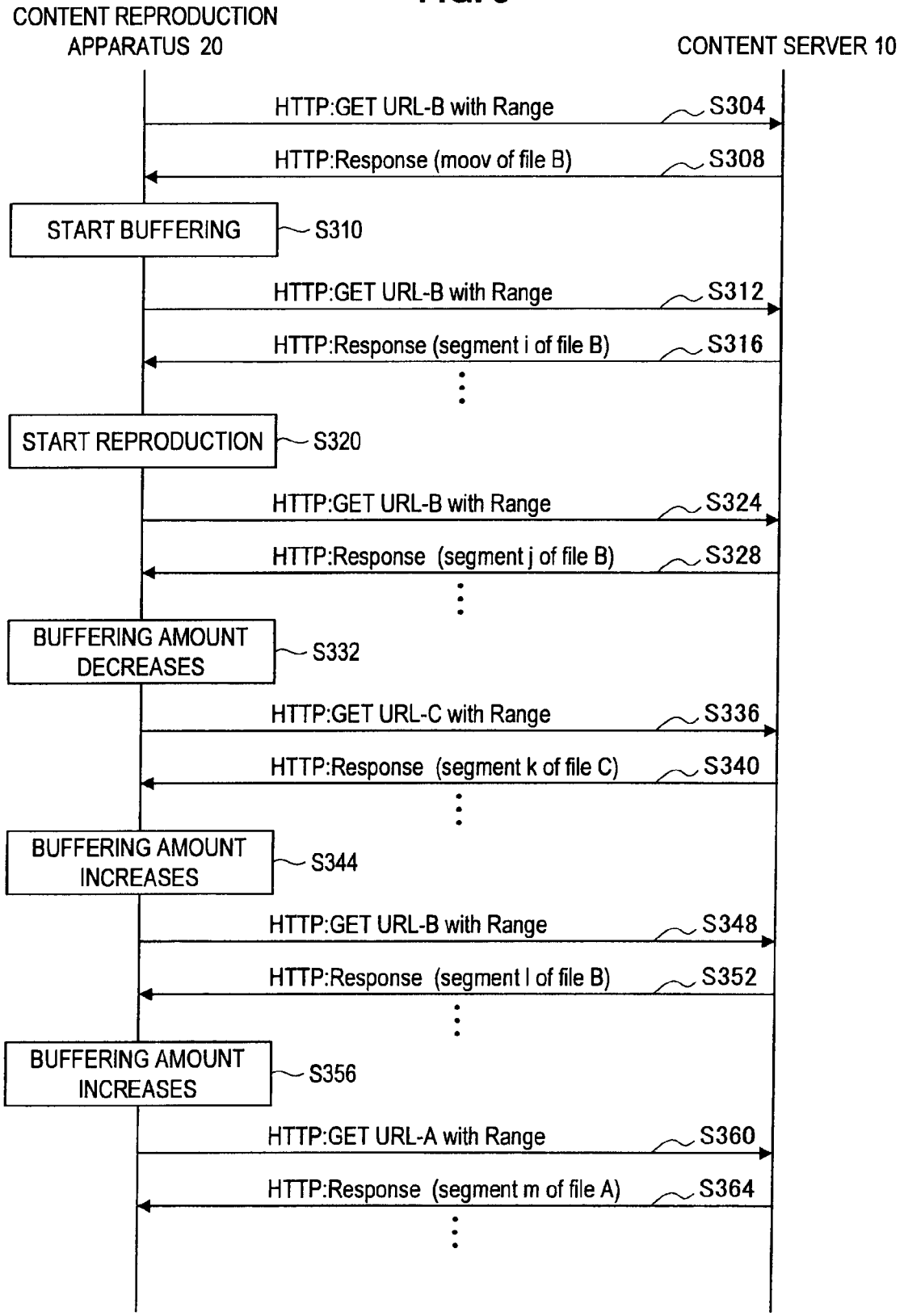
FIG. 9 is a sequence diagram showing an operation of the content reproduction system according to the present embodiment.

FIG. 9 is a sequence diagram showing the operation of the content reproduction system 1 according to the present embodiment. First, the acquisition unit 220 of the content reproduction apparatus 20 requests the transmission of "moov" of the MP4 file B concerning some content through "HTTP: GET URL-B with Range" from the content server 10 (S304). Then, the communication unit 140 of the content server 10 transmits "moov" of the MP4 file B to the content reproduction apparatus 20 as "HTTP: Response" (S308). It is assumed that URL-B of the MP4 file B is described in metadata information of the content and the content reproduction apparatus 20 has acquired the content. Then, the buffer 230 of the content reproduction apparatus 20 starts buffering of "moov" of the MP4 file B acquired from the content server 10 (S310).

Here, the selection unit 250 of the content reproduction apparatus 20 can determine whether a referred file of "trak" in "moov" belongs to an alternative media group obtained by encoding at different bit rates by checking "minfo" in "moov".

Then, if the referred file of "trak" in "moov" belongs to an alternative media group obtained by encoding at different bit rates, the selection unit 250 selects a segment Bi of the MP4 file B having the standard bit rate.

Next, the acquisition unit 220 requests the segment Bi of the MP4 file B selected by the selection unit 250 from the content server 10 by using "HTTP: GET URL-B with Range" (S312). More specifically, the acquisition unit 220 requests the segment Bi of the MP4 file B from the content server 10 by specifying network position information of the MP4 file B and position information of the segment Bi in the MP4 file B in bytes. The network position information of the MP4 file B and the position information of the segment Bi in the MP4 file B in bytes are described in "moov" of the MP4 file B received in step S308. Then, the communication unit 140 of the content server 10 transmits the segment Bi of the MP4 file B to the content reproduction apparatus 20 as "HTTP: Response" (S316).

Then, when the segment Bi is sufficiently buffered in the buffer 230 of the content reproduction apparatus 20, the reproduction unit 240 starts reproduction of the segment Bi (S320). If it is difficult to read from the buffer sufficiently even when a certain time passes after starting buffering (S310), the network band can be considered to be insufficient. In such a case, subsequent segment reading may be switched to segments in the file C from S316. Similarly, if predetermined segments are determined to be bufferable earlier, it is also possible to start reproduction after segments of the file A being buffered (S320).

Similarly, the acquisition unit 220 of the content reproduction apparatus 20 requests the next segment Bj from the content server 10 by using "HTTP: GET URL-B with Range" (S324). Then, the communication unit 140 of the content server 10 transmits the next segment Bj to the content reproduction apparatus 20 as "HTTP: Response" (S328).

If the buffering amount of the buffer 230 decreases and the reproducible time by samples buffered in the buffer 230 falls below a predetermined range (S332), the selection unit 250 selects a segment Ck of the MP4 file C having a low bit rate.

Then, the acquisition unit 220 requests the segment Ck of the MP4 file C selected by the selection unit 250 from the content server 10 by using "HTTP: GET URL-C with Range" (S336). The communication unit 140 of the content server 10 that has received the request transmits the segment Ck of the MP4 file C to the content reproduction apparatus 20 as "HTTP: Response" (S340).

Then, if the buffering amount of the buffer 230 increases and the reproducible time by samples buffered in the buffer 230 falls within the predetermined range (S344), the selection unit 250 selects the segment B1 of the MP4 file B having the standard bit rate.

Next, the acquisition unit 220 requests the segment B1 of the MP4 file B selected by the selection unit 250 from the content server 10 by using "HTTP: GET URL-B with Range" (S348). Then, the communication unit 140 of the content server 10 transmits the segment B1 of the MP4 file B to the content reproduction apparatus 20 as "HTTP: Response" (S352).

If the buffering amount of the buffer 230 increases still thereafter and the reproducible time by samples buffered in the buffer 230 exceeds the predetermined range (S356), the selection unit 250 selects a segment Am of the MP4 file A having a high bit rate.

Next, the acquisition unit 220 requests the segment Am of the MP4 file A selected by the selection unit 250 from the content server 10 by using "HTTP: GET URL-A with Range" (S360). Then, the communication unit 140 of the content server 10 transmits the segment Am of the MP4 file A to the content reproduction apparatus 20 as "HTTP: Response" (S352).

Hereinafter, the selection unit 250 similarly selects a segment having a bit rate to be requested in accordance with the buffering amount of the buffer 230, and the acquisition unit 220 acquires the segment selected by the selection unit 250 from the content server 10.

With such a configuration, reproduction can be prevented from being broken off when the band of the network 12 is small and high-quality reproduction can be realized when the band of the network 12 is large. Moreover, in the present embodiment, loads on the content server 10 can be reduced because the band of the network 12 can be determined and the segment to be requested can be selected from the content reproduction apparatus 20 side.

6. Modifications

An example that enables access to "mdat" of another file by using "dinf" in "trak" is described above, but as described with reference to FIG. 10, reference to "trak" of another file may be enabled by using "trak".

Figure 10:
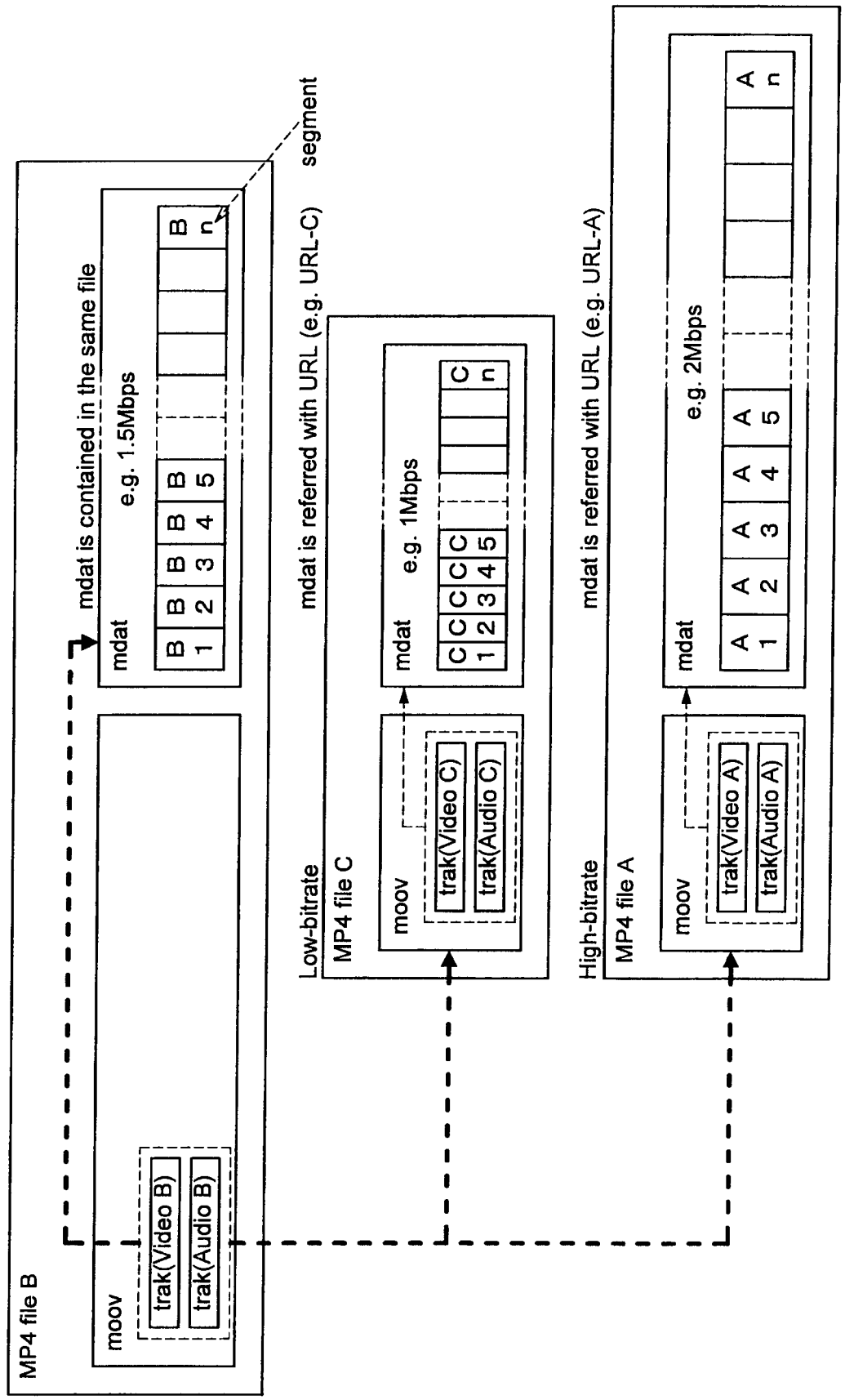
FIG. 10 is an explanatory view showing a modification of the MP4 file generated by the file generation unit in the present embodiment.

FIG. 10 is an explanatory view showing a modification of the MP4 file generated by the file generation unit 120 in the present embodiment. If, as shown in FIG. 10, access information to "trak" of the MP4 file A is written into "trak" of the MP4 file B, the content reproduction apparatus 20 can acquire "trak" of the MP4 file A by analyzing "trak" of the MP4 file B and using the described access information. Thus, the content reproduction apparatus 20 can acquire the segments A1, A2, . . . based on "trak" of the MP4 file A and Sample Description box described therein.

Similarly, if access information to "trak" of the MP4 file C is written into "trak" of the MP4 file B, the content reproduction apparatus 20 can acquire "trak" of the MP4 file C by analyzing "trak" of the MP4 file B and using the described access information. Thus, the content reproduction apparatus 20 can also acquire the segments C1, C2, . . . based on "trak" of the MP4 file C and Sample Description box described therein.

More specifically, the MP4 file format may be extended to write an extended box shown below into "minfo", "<uuid_value>: T. B. D" into "extended_type" in the syntax, the URL of the referred MP4 file into "location", and the identifier of "trak" in the referred MP4 file into "track_ID". Accordingly, the content reproduction apparatus 20 can recognize that alternative media data as media data on a track of the file B is located on a track indicated by track_id of the file C. Moreover, bit rate information such as the maximum bit rate maxbitrate and the average bit rate avgbitrate of media are also described, which can be used by the content reproduction apparatus 20 to determine the encoded data segments of which are to be acquired.

(Syntax example)

```
aligned(8) class AlternateMediaReferenceBox extends
FullBox( 'uuid' , version=0,
    flags = 0, extended_type){unsigned int(32) entry_count;
    for (i=1; i · entry_count; i++) {
        string location;    // URL
        unsigned int(32) track_ID;
        unsigned int(32) maxbitrate;
        unsigned int(32) avgbitrate;
    }
}
```

The above configuration is similarly applicable to a file format in which access information contained in "moov" is arranged in a distributed manner by using "moov" and "moof". In this case, as shown in FIG. 11, "trak" and "traf" of another file can be accessed using "trak" of the MP4 file B by writing access information to "trak" of the other file into "trak".

Figure 11:
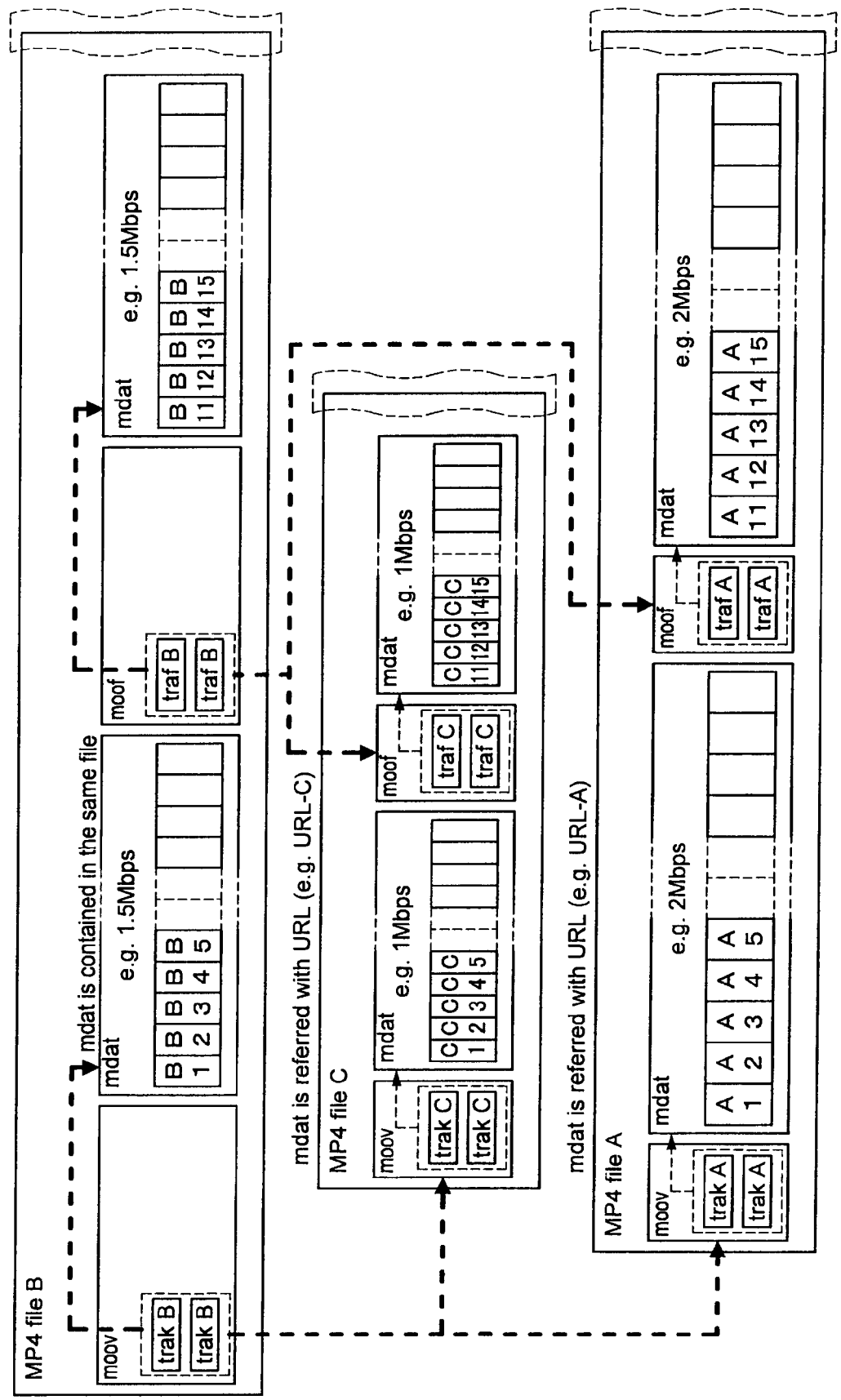
FIG. 11 is an explanatory view showing a modification of the MP4 file generated by the file generation unit in the present embodiment.

FIG. 11 is an explanatory view showing a modification of the MP4 file generated by the file generation unit 120 in the present embodiment. As shown in FIG. 11, if access information to "trak" of the MP4 file A is written into "trak" of the MP4 file B, the content reproduction apparatus 20 can acquire "trak" of the MP4 file A by analyzing "trak" of the MP4 file B and using the described access information. Thus, the content reproduction apparatus 20 can also acquire segments A11, A12, . . . based on "trak" of the MP4 file A.

Similarly, if access information to "trak" of the MP4 file C is written into "trak" of the MP4 file B, the content reproduction apparatus 20 can acquire "trak" of the MP4 file C by analyzing "trak" of the MP4 file B and using the described access information. Thus, the content reproduction apparatus 20 can also acquire segments C11, C12, . . . based on "trak" of the MP4 file C and each "traf". While the position in the file of "moof" of each file can be acquired by the BOX structure of an MP4 file being analyzed by the content reproduction apparatus 20, position information of each moof may be acquired by using Movie Fragment Random access box described in the MP4 file to access, after the relevant moof information being acquired, each segment of mdat subsequent to the moof. Moreover, mdat immediately after "moof" can be read without time delay by reading moof information in advance and analyzing "traf".

7. Conclusion

In the present embodiment, as described above, the selection unit 250 of the content reproduction apparatus 20 selects segments having the bit rate to be requested in accordance with the band of the network 12 and the acquisition unit 220 acquires the selected segment from the content server 10. Therefore, according to the present embodiment, loads on the content server 10 can be reduced.

The present embodiment mostly conforms to existing standards such as HTTP and MP4. Therefore, the present embodiment is compatible with streaming using existing HTTP and MP4 and can minimize extensions so that smooth introduction thereof can be expected.

Moreover, in the present embodiment, "mdat" having different bit rates are created in different MP4 files rather than in the same MP4 file. Thus, each MP4 file can be used not only for streaming, but also for downloading without hindrance.

It should be understood by those skilled in the art that various modifications, combinations, sub-combinations and alterations may occur depending on design requirements and other factors insofar as they are within the scope of the appended claims or the equivalents thereof.

For example, each step of processing of the content reproduction system 1 herein is not necessarily executed chronologically in the order described as a sequence diagram. For example, each step of processing of the content reproduction system 1 may be executed in an order different from the order described as a sequence diagram or in parallel.

A computer program to cause hardware such as the CPU 201, the ROM 202, and the RAM 203 contained in the content reproduction apparatus 20 and the content server 10 to perform the function equivalent to that of each component of the content reproduction apparatus 20 and the content server 10 described above can be created. Moreover, a storage medium in which the computer program is stored is also provided.

In the present embodiment, as shown in FIGS. 6, 7, 10, and 11, encoded data at the standard bit rate is arranged in the first data file, but encoded data at a low bit rate or a high bit rate may also be arranged.

In the present embodiment, as shown in FIGS. 6, 7, 10, and 11, encoded data is arranged in the first data file, but only access information to such encoded data may be arranged in moof of the first data file.

In the present embodiment, as shown in FIG. 7, an example in which "moov", "moof", and "mdat" are arranged in a distributed manner is shown, but distributed arrangement may be limited to the first data file so that, as shown in FIG. 8, other data files are constituted by "moov" and "mdat" corresponding thereto.

Figure 12:
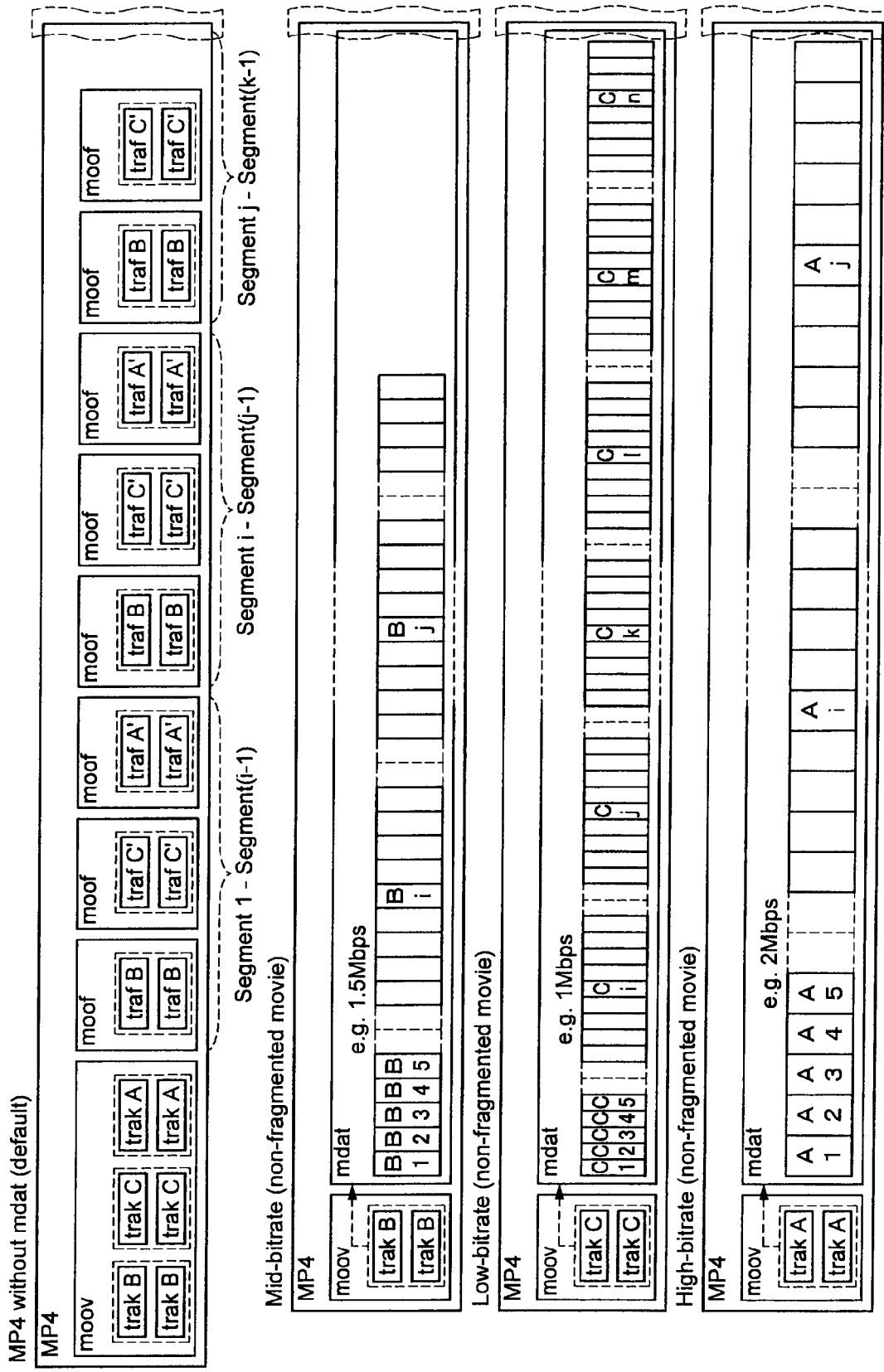
FIG. 12 is an explanatory view showing a modification of the MP4 file generated by the file generation unit in the present embodiment.

Further, FIG. 12 shows an embodiment when the first data file does not contain encoded data. The first data file has access information to each segment arranged in other data files described therein. Access information is arranged in the first data file in a distributed manner by using "moov" and "moof" and each "moof" has only access information to segments of only one data file described therein.

In this case, "traf" of each of a video track and an audio track has access information to each segment described in each "moof" and access information to segments in a range of sets of "moof" arranged consecutively (three sets in this case) described therein.

In the example shown in FIG. 12, each "trak" of "moov" does not contain access information to segments and the next three "moof" have access information from segment 1 to segment (i-1) described therein. Similarly, the next three "moof" have access information from segment i to segment (j-1) described therein and further, the next three "moof" have access information from segment j to segment (k-1) described therein. The arrangement order of "trak" in "moov" (that is, B, C, A) and the arrangement order of "traf" in three "moof" (that is, B, C, A) match, which makes reading of "traf" easier.

By configuring the first data file in this manner, access information to segments can easily be obtained only by analyzing the first data file. Moreover, segment information of each data file is divided in units of "moof" and thus, the content reproduction apparatus 20 can perform adaptive streaming while selecting a data file of the appropriate bit rate matching network conditions by acquiring and holding only "moof" of a necessary data file without holding access information to segments of all data files.

Data files that do not contain encoded data are not distributed by "moof" and are constituted by "moov" and "mdat" and thus, such data files can be used for a content reproduction apparatus that only supports streaming using existing HTTP and MP4.

By considering issues such as being unable to reproduce by an existing content reproduction apparatus because the first data file does not contain encoded data, a mechanism may be provided to reproduce a first MP4 file if a content reproduction apparatus is provided for adaptive streaming and otherwise, an MP4 file that is not distributed is reproduced. For example, a method by which a content reproduction apparatus is caused to disclose each URL and attributes thereof to select the URL based on capability and attributes of the content reproduction apparatus is known.

The overview and specific examples of the above-described embodiment and the other embodiments are examples. The present invention may also be applied and can be applied to various other embodiments. It should be understood by those skilled in the art that various modifications, combinations, sub-combinations and alterations may occur depending on design requirements and other factors insofar as they are within the scope of the appended claims or the equivalents thereof.

What is claimed is:

1. A computer-implemented method, comprising:
   receiving a request for information associated with electronic content, the electronic content being stored in a plurality of different bit rates, wherein the electronic content comprises a plurality of segments stored in corresponding ones of the plurality of bit rates, and the information associated with the electronic content comprises an index of the stored segments;
   generating, using a processor, a first instruction to transmit the information associated with the electronic content to a device across a communications network;
   receiving a second request to access at least one segment of the stored electronic content selected by the device using the transmitted information associated with the electronic content, the second request further comprising information identifying the bit rate of the requested segment of the stored electronic content, the identified bit rate being indicative of a condition of the communications network; and
   generating, using the processor, a second instruction to transmit the requested segment to the device.

2. The method of claim 1, wherein the stored electronic content comprises at least one of encoded audio content or encoded video content.

3. The method of claim 1, wherein the information associated with the electronic content comprises information identifying network locations of the stored segments and corresponding bit rates of the stored segments.

4. The method of claim 3, wherein the network location information comprises uniform resource locators (URLs) corresponding to the stored segments.

5. The method of claim 1, wherein the second request comprises information identifying a network location associated with the requested segment of electronic content.

6. The method of claim 5, wherein the network location comprises a uniform resource locator (URL) associated with the requested segment.

7. The method of claim 5, further comprising accessing the requested segment based on at least the identified network location.

8. The method of claim 7, wherein:
   the network location corresponds to a plurality of segments of stored electronic content, the stored segments including the requested segment; and
   the second request further comprises information identifying a position of the requested segment within the stored segments.

9. The method of claim 8, wherein the accessing comprises:
   obtaining the stored segments based on the network location; and extracting the requested segment from the obtained segments, based on at least the identified position.

10. The method of claim 1, wherein the identified bit rate corresponds to a standard bit rate, the standard bit rate being selected by the device when an amount of electronic content buffered by the device falls within a predetermined range.

11. The method of claim 1, further comprising receiving, from the device, a third request to access an additional segment of the stored electronic content, the additional segment being associated with a bit rate that exceeds the identified bit rate of the second request.

12. The method of claim 11, wherein the bit rate of the additional segment indicates that an amount of electronic content buffered by the device exceeds a predetermined range.

13. The method of claim 1, further comprising receiving, from the device, a fourth request to access an additional segment of the stored electronic content, the additional segment being associated with a bit rate that falls below the identified bit rate of the second request.

14. The method of claim 13, wherein the bit rate of the additional segment indicates that an amount of electronic content buffered by the device falls below a predetermined range.

15. An apparatus, comprising:
   a receiving unit for receiving a request for information associated with electronic content, the electronic content being stored in a plurality of different bit rates, wherein the electronic content comprises a plurality of segments of electronic content stored in corresponding ones of the plurality of bit rates, and the information associated with the electronic content comprises an index of the stored segments; and
   a generation unit for generating a first instruction to transmit the information associated with the electronic content to a device across a communications network, wherein:
   the receiving unit is for further receiving a second request to access at least one segment of the stored electronic content selected by the device using the transmitted information associated with the electronic content, the second request further comprising information identifying the bit rate of the requested segment of the stored electronic content, the identified bit rate being indicative of a condition of the communications network; and the generating unit is for further generating a second instruction to transmit the requested segment to the device.

16. A tangible, non-transitory computer-readable medium storing instructions that, when executed by at least one processor, cause the at least one processor to perform a method comprising the steps of:

receiving a request for information associated with electronic content, the electronic content being stored in a plurality of different bit rates, wherein the electronic content comprises a plurality of segments stored in corresponding ones of the plurality of bit rates, and the information associated with the electronic content comprises an index of the stored segments;

generating a first instruction to transmit the information associated with the electronic content to a device across a communications network;

receiving a second request to access at least one segment of the stored electronic content selected by the device using the transmitted information associated with the electronic content, the second request further comprising information identifying the bit rate of the requested segment of the stored electronic content, the identified bit rate being indicative of a condition of the communications network; and generating a second instruction to transmit the requested segment to the device.

17. The apparatus of claim 15, wherein the identified bit rate corresponds to a standard bit rate, the standard bit rate being selected by the device when an amount of electronic content buffered by the device falls within a predetermined range.

18. The apparatus of claim 15, wherein the receiving unit is for further receiving, from the device, a third request to access an additional segment of the stored electronic content, the additional segment being associated with a bit rate that exceeds the identified bit rate of the second request.

19. The apparatus of claim 18, wherein the bit rate of the additional segment indicates that an amount of electronic content buffered by the device exceeds a predetermined range.

20. The apparatus of claim 15, wherein the receiving unit is for further receiving, from the device, a third request to access an additional segment of the stored electronic content, the additional segment being associated with a bit rate that falls below the identified bit rate of the second request.

21. The apparatus of claim 20, wherein the bit rate of the additional segment indicates that an amount of electronic content buffered by the device falls below a predetermined range.

22. The tangible, non-transitory computer-readable medium of claim 16, wherein the identified bit rate corresponds to a standard bit rate, the standard bit rate being selected by the device when an amount of electronic content buffered by the device falls within a predetermined range.

23. The tangible, non-transitory computer-readable medium of claim 16, wherein the receiving unit is for further receiving, from the device, a third request to access an additional segment of the stored electronic content, the additional segment being associated with a bit rate that exceeds the identified bit rate of the second request.

24. The tangible, non-transitory computer-readable medium of claim 23, wherein the bit rate of the additional segment indicates that an amount of electronic content buffered by the device exceeds a predetermined range.

25. The tangible, non-transitory computer-readable medium of claim 16, wherein the receiving unit is for further receiving, from the device, a third request to access an additional segment of the stored electronic content, the additional segment being associated with a bit rate that falls below the identified bit rate of the second request.

* * * * *